United States Patent
Ramachandrula et al.

(10) Patent No.: US 9,754,193 B2
(45) Date of Patent: Sep. 5, 2017

(54) AUTHENTICATING A USER BY CORRELATING SPEECH AND CORRESPONDING LIP SHAPE

(71) Applicants: HEWLETT-PACKARD DEVELOPMENT COMPANY, L.P., Houston, TX (US); Sitaram Ramachandrula, Karnataka (IN); Hariharan Ravishankar, Karnataka (IN)

(72) Inventors: Sitaram Ramachandrula, Bangalore (IN); Hariharan Ravishankar, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/892,011

(22) PCT Filed: Jun. 27, 2013

(86) PCT No.: PCT/IN2013/000397
§ 371 (c)(1),
(2) Date: Nov. 18, 2015

(87) PCT Pub. No.: WO2014/207752
PCT Pub. Date: Dec. 31, 2014

(65) Prior Publication Data
US 2016/0098622 A1    Apr. 7, 2016

(51) Int. Cl.
*G06K 9/00* (2006.01)
*G06K 9/62* (2006.01)
(Continued)

(52) U.S. Cl.
CPC ....... *G06K 9/6293* (2013.01); *G06K 9/00335* (2013.01); *G06K 9/00892* (2013.01);
(Continued)

(58) Field of Classification Search
CPC .......... G06K 9/00335; G06K 9/00892; G06K 9/629; G06K 9/6293; G06T 7/73;
(Continued)

(56) References Cited

U.S. PATENT DOCUMENTS

| 5,495,555 A | * | 2/1996 | Swaminathan | ......... G10L 19/12 704/207 |
| 6,219,639 B1 | * | 4/2001 | Bakis | ................. G06K 9/00885 382/116 |

(Continued)

FOREIGN PATENT DOCUMENTS

| CN | 101510256 | 1/2011 |
| CN | 101937268 | 1/2011 |

(Continued)

*Primary Examiner* — Mekonen Bekele
(74) *Attorney, Agent, or Firm* — HP Patent Department (57) ABSTRACT

Provided is a method of authenticating a user by correlating speech and corresponding lip shape. An audiovisual of a user requesting authentication is captured. The audiovisual is processed to generate a speech vector quantization sequence and a corresponding lip vector quantization sequence of the user. A likelihood of the speech vector quantization sequence and the corresponding lip vector quantization sequence with probability distributions of speech vector quantization code words corresponding to different lip shape vector quantization code words of the user requesting authentication weighed by probabilities of speech and lip vector quantization indices of the user requesting authentication is evaluated. If upon evaluation, a likelihood of the user requesting authentication being an authentic user is more than a predefined threshold, the user is authenticated.

15 Claims, 4 Drawing Sheets

(51) Int. Cl.
*G10L 17/10* (2013.01)
*G10L 19/038* (2013.01)
*G10L 25/51* (2013.01)
*G06T 7/73* (2017.01)
*G10L 19/00* (2013.01)

(52) U.S. Cl.
CPC ............... *G06K 9/629* (2013.01); *G06T 7/73* (2017.01); *G10L 17/10* (2013.01); *G10L 19/038* (2013.01); *G10L 25/51* (2013.01); *G06T 2207/10016* (2013.01); *G06T 2207/30201* (2013.01); *G10L 2019/0005* (2013.01)

(58) Field of Classification Search
CPC . G06T 2207/10016; G06T 2207/30201; G10L 17/10; G10L 19/038; G10L 25/51; G10L 2019/0005
USPC ......... 382/115, 116, 117, 118; 704/273, 208, 704/244, 250
See application file for complete search history.

(56) References Cited

U.S. PATENT DOCUMENTS

| | | | | |
|---|---|---|---|---|
| 6,243,677 | B1 * | 6/2001 | Arslan | G10L 15/07 704/244 |
| 7,684,982 | B2 * | 3/2010 | Taneda | G10L 15/25 379/392.01 |
| 8,331,616 | B2 * | 12/2012 | Sabe | G06K 9/00248 382/103 |
| 8,370,262 | B2 | 2/2013 | Blessing | |
| 2002/0116197 | A1 * | 8/2002 | Erten | G06K 9/6292 704/273 |
| 2003/0018475 | A1 * | 1/2003 | Basu | G06K 9/00228 704/270 |
| 2004/0091136 | A1 | 5/2004 | Dombrowski | |
| 2004/0120554 | A1 * | 6/2004 | Lin | G06K 9/00335 382/118 |
| 2006/0224382 | A1 * | 10/2006 | Taneda | G10L 15/25 704/233 |
| 2011/0235870 | A1 * | 9/2011 | Ichikawa | G06F 21/32 382/118 |
| 2013/0226587 | A1 * | 8/2013 | Cheung | G10L 15/25 704/273 |
| 2015/0187112 | A1 * | 7/2015 | Rozen | G06T 13/40 345/473 |
| 2015/0325240 | A1 * | 11/2015 | Li | G06K 9/00335 704/231 |

FOREIGN PATENT DOCUMENTS

| | | | |
|---|---|---|---|
| JP | 08076792 A | * | 3/1996 |
| JP | 2006/099626 | | 4/2006 |
| TW | 512308 A | * | 12/2001 |

* cited by examiner

AUTHENTICATING A USER BY CORRELATING SPEECH AND CORRESPONDING LIP SHAPE

BACKGROUND

A variety of user authentication mechanisms are available today. One of the most frequently used authentication mechanism requires a user to remember a secret combination of text and/or numeric characters, commonly known as "password". Another authentication mechanism requires a user to input an illustration or "doodle" on a display associated with a computing device for user verification. Biometric authentication has also become popular these days. Biometrics, which typically refers to the identification of humans by their characteristics or traits, is used for recognition and access control. Some well known human characteristics used in biometric authentication include fingerprints, face recognition, DNA, iris recognition, and odor.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

As mentioned earlier, biometric authentication uses technologies that measure and analyze human body characteristics, such as DNA, fingerprints, facial patterns and hand measurements, eye retinas and irises, for verification purposes.

Proposed is a solution that uses a novel approach of combining lip shapes and speech signals for biometric authentication. Since lip shapes and speech signals are highly correlated, by using a correlation between lip shapes and speech signals, the solution provides a more accurate and faster user authentication. Proposed solution overcomes issues faced by previous authentication systems like, mimicking, playing a recorded audio in front of the sensors, etc. Some use cases of the proposed authentication method include application in automated teller machines (ATMs), computer kiosks, etc., which could be especially useful for non-savvy people who tend to forget their ATM PINs and passwords.

Figure 1:
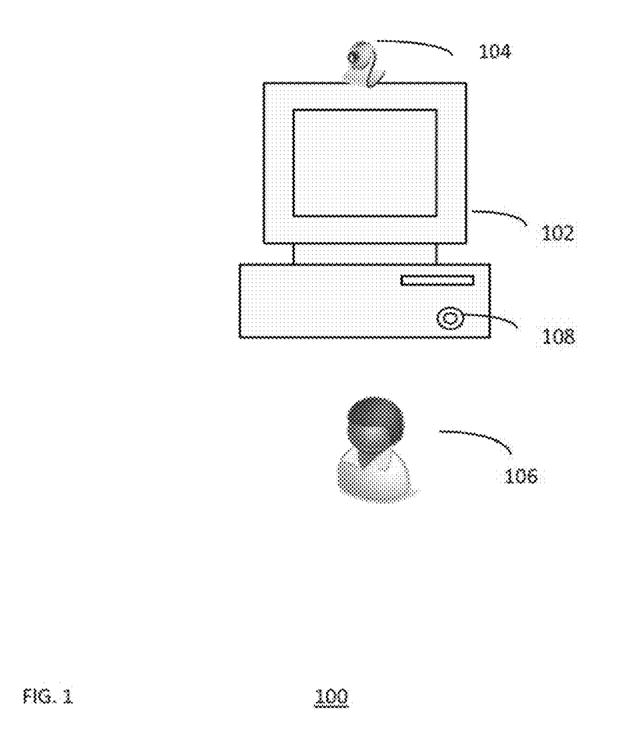
FIG. 1 is a block diagram of a system for authenticating a user by correlating speech and lip shape, according to an example.

FIG. 1 is a block diagram of a system for authenticating a user by correlating speech and lip shape, according to an example. System 100 includes computing device 102 and camera 104. Components of system 100 i.e. computing device 102 and camera 104 could be operationally coupled to each other. In an example, camera 104 may be integrated with computing device 102. In another example, camera 104 may connect to computing device 104 through wire or wireless means.

Computing device 102 may be a desktop computer, notebook computer, tablet computer, mobile phone, personal digital assistant (PDA), smart phone, server computer, and the like. Computing device 102 includes microphone 108 for capturing an audio input of a user. In an implementation, user 106 provides an audio-video (audiovisual) input (for example, for the purpose of authentication) to computing device 102. An audio-video input may include user 106 speaking in the vicinity of camera 104 (for instance, while facing camera 104) for some duration.

Camera 104 may include a still camera, a digital camera, a web camera, a video camera, and the like. In an implementation, camera 104 may include a microphone. Thus, camera 104 is capable of capturing audio signals and/or video images. In an implementation, camera 104 captures an audio-video input (for example, for the purpose of authentication) provided by user 106.

Figure 2:
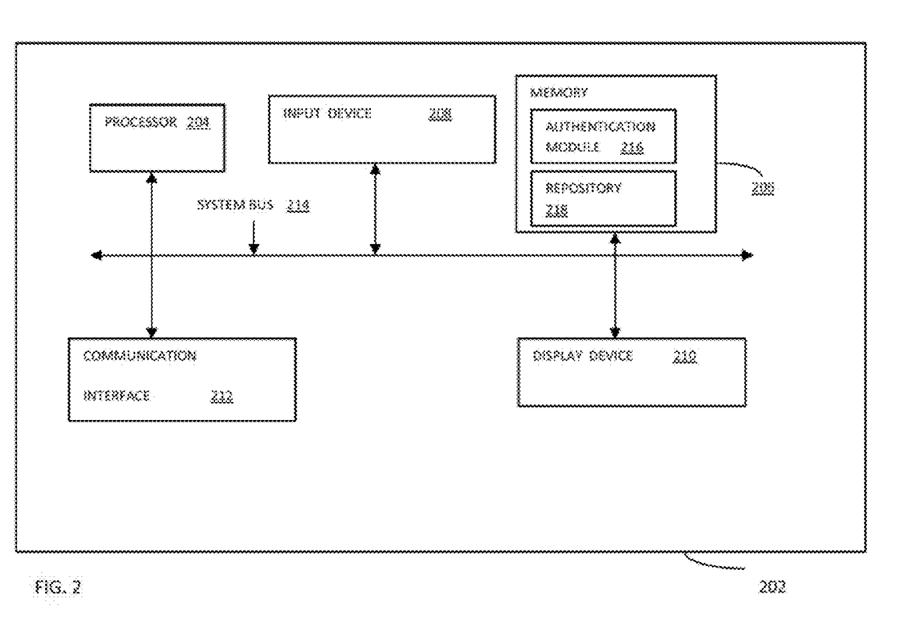
FIG. 2 shows a block diagram of an authentication module hosted on a computer system, according to an example.

FIG. 2 shows a block diagram of an authentication module hosted on a computer system 202, according to an example.

Computer system 202 may be a computer server, desktop computer, notebook computer, tablet computer, mobile phone, personal digital assistant (PDA), or the like. In an example, computer system 202 may be computer system 102 of FIG. 1.

Computer system 202 may include processor 204, memory 206, input device 208, display device 210, and communication interface 212. The components of the computing system 202 may be coupled together through a system bus 214.

Processor 204 may include any type of processor, microprocessor, or processing logic that interprets and executes instructions.

Memory 206 may include a random access memory (RAM) or another type of dynamic storage device that may store information and instructions non-transitorily for execution by processor 204. For example, memory 206 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc.

Memory 206 includes authentication module 216 and repository 218. In an implementation, authentication module 216 (machine executable instructions) processes an audio-visual provided by a user requesting authentication to generate a speech vector quantization sequence and a corresponding lip vector quantization sequence of the user; evaluates a likelihood of the speech vector quantization sequence and the corresponding lip vector quantization sequence with probability distributions of speech vector quantization code words corresponding to different lip shape vector quantization code words of the user requesting authentication weighed by probabilities of speech and lip vector quantization indices of the user requesting authentication; and authenticate the user, if upon evaluation, a likelihood of the user requesting authentication being an authentic user is more than a predefined threshold.

Authentication module 216 may be implemented in the form of a computer program product including computer-executable instructions, such as program code, which may be run on any suitable computing environment in conjunction with a suitable operating system, such as Microsoft Windows, Linux or UNIX operating system. In an implementation, authentication module 216 may be installed on a computer system. In a further implementation, authentication module 216 may be read into memory 206 from another computer-readable medium, such as data storage device, or from another device via communication interface 212.

In an implementation, repository 218 stores the probability distributions of speech vector quantization code words corresponding to different lip shapes (or different lip vector quantization (VQ) indices) of a plurality of users including an authentic user. Repository 218 may also store a universal vector quantization codebook of speech signals and a universal vector quantization codebook of lip shapes for a plurality of users including an authentic user. Repository 218 also stores probability distributions of universal speech vector quantization indices and universal lip shape vector quantization indices for each user.

Communication interface 212 may include any transceiver-like mechanism that enables computing device 202 to communicate with other devices and/or systems via a communication link. Communication interface 212 may be a software program, a hard ware, a firmware, or any combination thereof. Communication interface 212 may use a variety of communication technologies to enable communication between computer server and another computing device. To provide a few non-limiting examples, communication interface may be an Ethernet card, a modem, an integrated services digital network ("ISDN") card, a network port (such as a serial port, a USB port, etc.) etc.

Input device 208 may include a keyboard, a mouse, a touch-screen, or other input device. Display device 210 may include a liquid crystal display (LCD), a light-emitting diode (LED) display, a plasma display panel, a television, a computer monitor, and the like.

It would be appreciated that the system components depicted in FIG. 2 are for the purpose of illustration only and the actual components may vary depending on the system and architecture deployed for implementation of the present solution.

Figure 3:
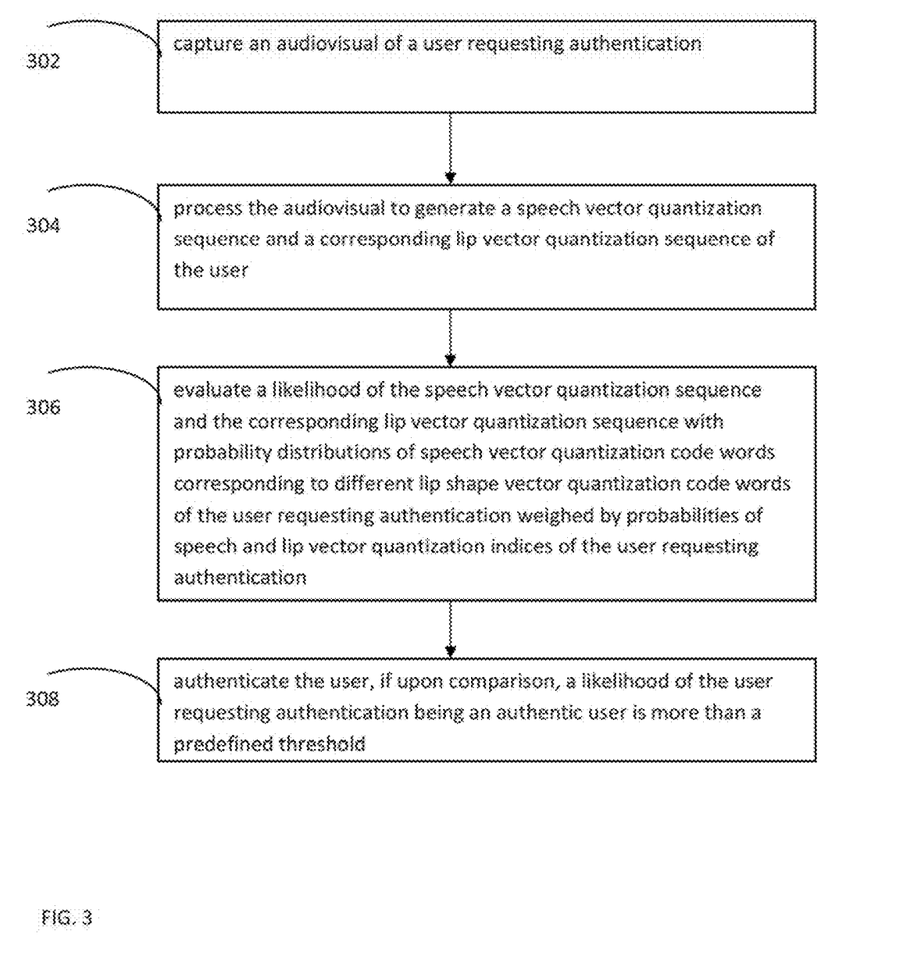
FIG. 3 illustrates a method of authenticating a user by correlating speech and lip shape, according to an example.

FIG. 3 illustrates a method of authenticating a user by correlating speech and lip shape, according to an example. At block 302, an audiovisual of a user requesting authentication is captured. To provide an example, let's assume that a user wants to access a computing system or device that requires user authentication before the user is allowed to operate or engage with the device. In such case, once the user requests authentication for operating the device, an audiovisual of the user requesting authentication is captured. In another example, let's assume that a user wants to access a facility (for example, an office) or building (such as hospital, library, etc.) whose entry is restricted and subject to user authentication. In such case, once a user requests authentication for accessing the facility or building, an audiovisual of the user requesting authentication may be captured. The aforementioned examples simply illustrate different scenarios of a user requesting authentication and no limitation should be read into them.

A camera along with a microphone may be used to capture an audiovisual of the user requesting authentication. The camera may be integrated with the computing device or coupled with the computing device through a wired (for example, a coaxial cable) or wireless (for example, Wi-Fi) communication means.

At block 304, the audiovisual captured at block 302 is processed to generate a speech vector quantization (VQ) sequence and a corresponding lip vector quantization (VQ) sequence of the user. In other words, the speech signal in the audiovisual is processed to create a speech vector quantization sequence of the user, and the video signal is processed to create a corresponding lip vector quantization sequence of the user.

Quantization is a process of mapping an infinite set of scalar or vector quantities by a finite set of scalar or vector quantities. Vector quantization (VQ) deals with quantizing the vector samples into groups called clusters. It works by dividing a large set of points (vectors) into groups having approximately the same number of points closest to them. Each group is represented by a codevector, and a set of all codevectors is called the codebook. The codebook is typically designed for a signal vector having a particular probability distribution. In the present context, a speech vector quantization sequence may represent speech VQ code word indices and a lip vector quantization sequence may represent lip shape VQ code word indices.

In an example, the speech vector quantization sequence and the lip vector quantization sequence of the user may be denoted as below (Table 1):

| $S_{14}$ | $S_{45}$ | $S_1$ | $S_{194}$ | $S_4$ | $S_{234}$ | $S_{414}$ | $S_{247}$ | $S_{14}$ | $S_{74}$ | $S_{37}$ | $S_{98}$ | $S_{32}$ | $S_{14}$ | $S_{374}$ | $S_{214}$ | $S_{454}$ | $S_{374}$ |
|---|---|---|---|---|---|---|---|---|---|---|---|---|---|---|---|---|---|
| $L_{14}$ | | | $L_{145}$ | | | $L_{243}$ | | | $L_{435}$ | | | $L_{222}$ | | | | $L_9$ | |

The first row in Table 1 above represents the speech VQ codeword indices of the speech signal from the captured audiovisual of the user. The second row depicts the lip shape VQ codeword indices of the corresponding lip authentication signal from the audiovisual. The time "t" elapsed is represented horizontally. In an implementation, to use a different periodicity of lip shape VQ code words compared to speech VQ code words, the lip framing or sampling interval may be kept three times less than that of speech frame shift. The time correspondence of lip and speech VQ code words is depicted as columns in Table 1.

At block 306, a likelihood of the speech vector quantization sequence and the corresponding lip vector quantization sequence is evaluated with probability distributions of speech vector quantization code words corresponding to different lip shape vector quantization code words of the user requesting authentication weighed by probabilities of speech and lip vector quantization indices of the user requesting authentication. In other words, the audiovisual signal of the user requesting authentication is compared with probability distributions of speech vector quantization code words corresponding to different lip shapes of an authentic or claimed user i.e. a user who is authorized to operate a computer system or access a facility as the case may be.

In an implementation, probability distributions of speech vector quantization code words corresponding to different lip shapes of a user (including an authentic user) are obtained as follows.

Figure 4:
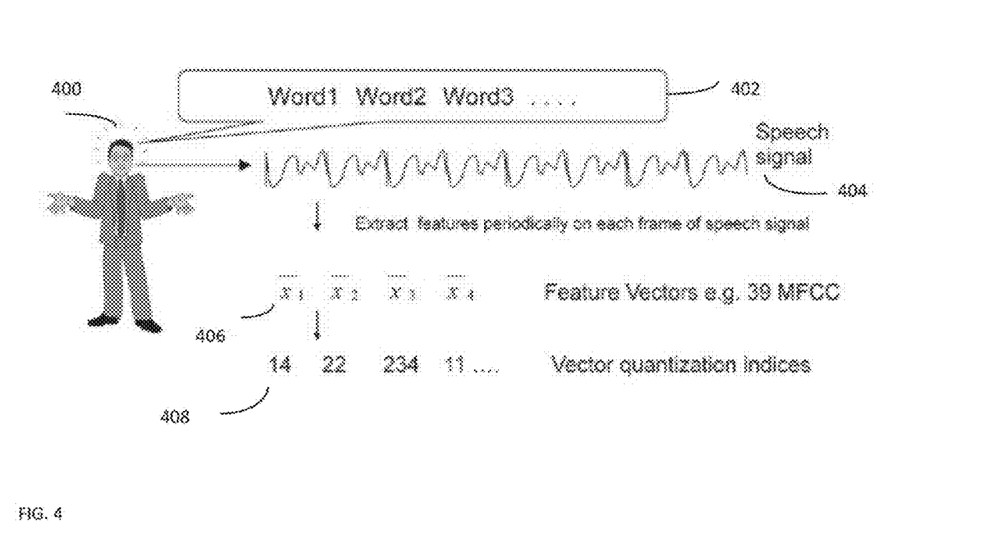
FIG. 4 illustrates a feature vector extraction and vector quantization encoding of a speech signal, according to an example.

Generating a Universal Codebook, or Speech Signals:

A universal codebook for speech signals is created by extracting, from a speech signal repository of a plurality of speakers, feature vectors on each sequential frame of speech. In an example, these may be standard Mel frequency cepstral coefficients. Next, a universal vector quantization codebook (e.g., of 512 code-vectors) is trained (for example, using K-means clustering procedure). In an implementation, each code-vector symbolized as $\vec{S}_i$ (exemplary feature vector) or corresponding code-word symbolized as $S_i$ may represent one of the possible spectral shapes of a speech signal. The set of code vectors in a codebook titled "S" may represent all possible spectral shapes of speech signals from all the speakers. Thus, any speech signal may be represented as a sequence of feature vectors or even a sequence of VQ code-word indices. This process is illustrated in FIG. 4, which shows feature vector extraction and vector quantization encoding, according to an example. Referring to FIG. 4, a speech signal 404 is extracted from an audiovisual 402 of an individual 400. Next, speech feature vectors 406 are extracted from speech signal 404. Later, vector quantization is used to compress speech feature vectors 406 by representing a vector with a codevector. Subsequently, an index 408 identifying the codevector is used to represent the original speech signal.

In an implementation, it is also possible to model co-occurrence statistics or probability distributions using multivariate continuous probability density functions of speech feature vectors dependent on each lip shape codeword indices (rather than discrete probability mass functions) to achieve higher accuracy.

Generating a Universal Codebook for Lip Shapes:

A video signal repository of a plurality of individuals is created by capturing frontal videos of such individuals. Using the video signal database of detected lips, a universal codebook for lip shapes is generated by extracting lip features from sequential frames of video signals. Based on extracted lip features, from the database of lip feature vectors corresponding to all individuals, a universal vector quantization codebook of lip shapes (e.g., of 256 code vectors) is trained. In an example, each code-vector, symbolized as $\vec{L}_i$ or corresponding code-word, symbolized as $L_i$ may represent one possible lip shape. The set of codevectors in codebook titled "L" may represent all possible lip shapes of all individuals. Similar to speech signal representation using VQ codeword sequence (described earlier), the lip shape sequence from sequential frames of a video of an individual also can be represented as a sequence of lip feature vectors or even as a sequence of lip VQ code words.

Figure 5:
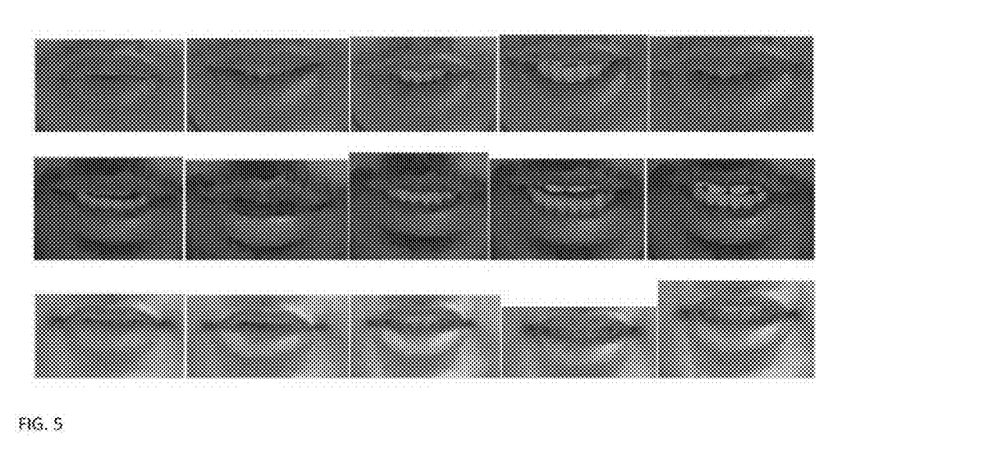
FIG. 5 illustrates lip shapes of different individuals, according to an example.

To extract lip features, typically, first the face of an individual (in a video) is detected followed by lips. There are a number of algorithms described in the art that could be used for face and lip detection. Lip shapes may be extracted and their features measured by using Active shape models (ASM). FIG. 5 illustrates lip shapes of three different individuals, according to an example. Each row in FIG. 5 corresponds to different frames of a common video recorded for each individual. In other words, these frames represent lip shapes of individuals when they are mouthing or speaking same words.

In an implementation, different vector quantization codebooks (for lips and speech) may be trained for each user in contrast to universal codebooks for all users. And probability distribution of speech vector quantization code words and the probability distributions of lip shape vector quantization code words are generated for each enrolled user in another implementation, a pair of Hidden Markov models (HMMs) can be used to model a known text of speech and its corresponding lip shapes to validate both the signal sources.

Creating a Set of Probability Distributions of Speech Vector Quantization (VQ) Code Words Corresponding to Each Lip Vector Quantization (VQ) Code Word:

A video database of a plurality of individuals (speaking while facing the camera) is created to train the universal codebook for speech signals and universal codebook for lip shapes. Once the codebooks are ready, each video signal in the database is represented into two parallel or synchronized sequences of lip shape VQ code words and speech VQ code words using corresponding feature extraction techniques and encoding using corresponding VQ codebooks. Since a video signal can provide a speech signal and a corresponding lip shape sequence signal, there is implicit time synchronization (time correspondence) between lip frames and speech frames. Considering the aforesaid, a set of probability distributions of speech VQ code words corresponding to each lip VQ code word is created for each enrolled user.

Since for each lip feature code word, all the speech VQ code words may occur with a unique set of probabilities for each individual, the probability distributions for a speaker may be represented as: $P(S_i/L_1)_1, P(S_i/L_2)_1, \ldots P(S_i/L_{256})_1$. This is assuming that there are 256 lip code words in all. The aforementioned equation therefore provides probabilities of all $S_i$ code words (i.e., spanning over all possible speech VQ words) conditioned on each of the $L_i$ lip VQ code words. Speech VQ probability distributions corresponding to various lip shapes of a plurality of speakers may be represented as follows:

Speaker 1: $P(S_i/L_1)_1, P(S_i/L_2)_1, \ldots, P(S_i/L_{256})_1$
Speaker 2: $P(S_i/L_1)_2, P(S_i/L_2)_2, \ldots, P(S_i/L_{256})_2$
Speaker 3: $P(S_i/L_1)_3, P(S_i/L_2)_3, \ldots, P(S_i/L_{256})_3$
. . .
Speaker N: $P(S_i/L_1)_N, P(S_i/L_2)_N, \ldots, P(S_i/L_{256})_N$ Where,
$S_i$ represents speech code words and each of $L_{1\text{-}to\text{-}256}$ represent the lip shapes Apart from this, the probability distribution of each speech VQ index $P(S_i/N)$ and each lip VQ index $P(L_i/N)$ in the corresponding VQ codebooks is also calculated for each enrolled user 'N'.

These set of probabilities can be calculated for each speaker to be authenticated by recording an enrolment video of 3-5 minutes. The individuals may be asked to read out some text, wherein the selected text may include all the phonemes in sufficient numbers so that all possible lip shapes which an individual can make could be covered. It is assumed an individual can make finite lip shapes while speaking. It may be possible that in case of a few speakers some lip shapes (or lip VQ code words) may not occur at all. For all such cases, the probabilities of speech VQ code words are fixed at a minimum level, by adjusting remaining (non-zero) codeword probabilities, so that they follow stochastic constraints.

At block 308, if upon evaluation, a likelihood of the user requesting authentication being an authentic user is more than a predefined threshold, the user is authenticated as a valid or real user. In other words, if upon comparison of the speech vector quantization sequence and the corresponding lip vector quantization sequence of a user requesting authentication with probability distributions of speech vector quantization code words corresponding to different lip shapes of an authentic user, it is found that the likelihood of the user requesting authentication being an authentic user is more than a predefined threshold the user is authenticated as a genuine user.

In the above case, the likelihood of a user equesting authentication may be found with the following equation:

$$\text{Likelihood}_{Like_N} = \prod_{t=1}^{T} \prod_{i=1}^{3} P(S_{t\ldots i}/L_t)_N P(S_{t\ldots i}/N) P(L_t/N)$$

Where, "N" is the user requesting authentication and "t" indexes the time of lip vector quantization (VQ) sequence and "i" indexes three consecutive speech vector quantization (VQ) code words within each lip frame. It may be noted that this equation assumes independence between consecutive frames. The terms $P(S_{t,i}/N)$ and $P(L_t/N)$ give the probabilities of speech VQ index $S_{t,i}$ and lip VQ index $L_t$ corresponding to the user 'N' respectively. Each user may have high likelihood only for a subset of speech and lip VQ indices in the codebooks.

A threshold for the above likelihood can be predefined, based on which a user can either be authenticated or denied. Upon authentication, the user may be given access to a computing device or a facility depending on how and where the authentication process is being used.

In an implementation, instead of using threshold for accepting a user's likelihood, it is possible to compare the requesting user's likelihood of being an authentic user by using probability distributions calculated on VQ codebooks designed for user's signals alone with likelihood using probability distributions calculated on VQ codebooks designed for all the users.

In another implementation, it is also possible to formulate the solution simply based on the probabilities of co-occurrences of lip and speech VQ indices without using conditional probabilities.

Proposed solution can provide a quick and accurate user authentication as compared to just using a speech or lip modality. It uses an unobtrusive way of calculating co-occurrence statistics, while enrolling a user, by exploiting time synchronization of speech and lip shapes making the solution easier to deploy. Since the solution is text and language independent, it has universal applicability. Proposed solution also helps avoid some common frauds such as mimicry, playing recorded audio, showing a photo, etc. which could be used to deceive a biometric solution based on speech or lip modalities.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific integrated Circuits (ASIC) and other computing devices. The module may reside on a volatile or non-volatile storage medium and configured to interact with a processor of a computer system.

It would be appreciated that the system components depicted in the illustrated figures are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method of authentication by correlating speech and corresponding lip shape of a user, comprising:

capturing an audiovisual of a user requesting authentication;

processing the audiovisual to generate a speech vector quantization sequence and a corresponding lip vector quantization sequence of the user;

evaluating a likelihood of the speech vector quantization sequence and the corresponding lip vector quantization sequence to be from an authentic user based on co-occurrence probability distributions of consecutive speech vector quantization code words within a lip frame in the lip vector quantization sequence at a particular time, and weighted by probability distribution of vector quantization indices of speech and lip features corresponding to the user as indexed in a codebook; and authenticating the user, if upon evaluation, a likelihood of the user requesting authentication being the authentic user is more than a predefined threshold.

2. The method of claim 1, wherein the likelihood of the user requesting authentication being the authentic user is determined in accordance with the following equation:

$$\text{Likelihood}_{Like_N} = \Pi_{t=1}^{T} \Pi_{i=1}^{3} P(S_{t...i}/L_t)_N P(S_{t...i}/N) P(L_i/N)$$

where, "N" is the user requesting authentication, "t" indexes time of the lip vector quantization sequence and "i" indexes three consecutive speech vector quantization code words within each lip frame in the lip vector quantization sequence, $P(S_i/L_i)_N$ represents co-occurrence probability distribution, and $P(S_i/N)$, and $P(L_i/N)$ represent probability distributions of vector quantization indices of speech and lip features correspondingly, of the user requesting authentication 'N'.

3. The method of claim 1, further comprising generating the probability distributions of speech vector quantization code words corresponding to different lip shapes of the authentic user.

4. The method of claim 3, wherein generating the probability distributions of speech vector quantization code words corresponding to different lip shapes of the authentic user comprises:

capturing an audiovisual of the authentic user;

processing the audiovisual to generate a speech vector quantization sequence and a corresponding lip vector quantization sequence of the authentic user; and determining probability distributions of the speech vector quantization code words corresponding to different lip shapes of the authentic user.

5. The method of claim 1, wherein the speech vector quantization sequence and the corresponding lip vector quantization sequence are compared using a different sampling interval.

6. The method of claim 1, further comprising generating a universal vector quantization codebook of speech signals for a plurality of users including the authentic user.

7. The method of claim 1, further comprising generating a universal vector quantization codebook of lip shapes for a plurality of users including the authentic user.

8. The method of claim 1, further comprising generating the probability distributions of speech vector quantization code words and the probability distributions of lip shape vector quantization code words for each enrolled user.

9. A system, comprising:
a processor; and
a memory coupled to the processor, wherein the memory includes an authentication module to:
process an audiovisual of a user requesting authentication to generate a speech vector quantization sequence and a corresponding lip vector quantization sequence of the user;
evaluate a likelihood of the speech vector quantization sequence and the corresponding lip vector quantization sequence to be from an authentic user based on co-occurrence probability distributions of consecutive speech vector quantization code words within a lip frame in the lip vector quantization sequence at a particular time, and weighted by probability distribution of vector quantization indices of speech and lip features corresponding to the user as indexed in a codebook; and
authenticate the user, if upon evaluation, a likelihood of the user requesting authentication being the authentic user is more than a predefined threshold.

10. The system of claim 9, further comprising a camera to capture the audiovisual of the user requesting authentication.

11. The system of claim 9, further comprising a repository for storing the probability distributions of speech vector quantization code words corresponding to different lip shapes of the authentic user.

12. The system of claim 9, wherein the authentication module generates the probability distributions of speech vector quantization code words corresponding to different lip shapes of the authentic user.

13. A method of authentication by correlating speech and corresponding lip shape of a user, comprising:
capturing an audiovisual of a user requesting authentication;
processing the audiovisual to generate a speech vector quantization (VQ) sequence and a corresponding lip shape VQ sequence of the user, wherein the speech VQ sequence includes speech VQ code word indices and the lip VQ sequence includes lip shape VQ code word indices respectively;
evaluating a likelihood the speech VQ code word indices and the lip shape VQ code word indices with probability distributions of consecutive speech VQ code word indices within a lip shape VQ code word indices weighed by probabilities of speech and lip vector quantization sequence at a particular time, and weighted by probability distribution of vector quantization indices of speech and lip features corresponding to the user as indexed in a codebook; and
authenticating the user, if upon evaluation, the likelihood of the user requesting authentication being an authentic user is more than a predefined threshold.

14. The method of claim 13, wherein the lip shape VQ code word indices correspond to the speech VQ code word indices.

15. The method of claim 13, wherein the speech VQ sequence and the corresponding lip shape VQ sequence of the user are synchronized with each other.

* * * * *

UNITED STATES PATENT AND TRADEMARK OFFICE
CERTIFICATE OF CORRECTION

PATENT NO. : 9,754,193 B2
APPLICATION NO. : 14/892011
DATED : September 5, 2017
INVENTOR(S) : Sitaram Ramachandrula et al.

It is certified that error appears in the above-identified patent and that said Letters Patent is hereby corrected as shown below:

In the Claims

In Column 8, Line 22, in Claim 2, delete "P(Li/N)" and insert -- P(Lt/N) --, therefor.
In Column 8, Line 27, in Claim 2, delete "P(Si/Li)N" and insert -- P(Si/Lt)N --, therefor.

Signed and Sealed this
Sixth Day of March, 2018

Andrei Iancu
*Director of the United States Patent and Trademark Office*